United States Patent
Bartlett

(10) Patent No.: US 9,633,336 B2
(45) Date of Patent: Apr. 25, 2017

(54) METHOD, SYSTEM, AND APPARATUS FOR TRUNCATING MARKUP LANGUAGE EMAIL MESSAGES

(75) Inventor: Troy Lee Bartlett, Roswell, GA (US)

(73) Assignee: Nokia Technologies Oy, Espoo (FI)

( * ) Notice: Subject to any disclaimer, the term of this patent is extended or adjusted under 35 U.S.C. 154(b) by 747 days.

(21) Appl. No.: 12/156,537

(22) Filed: Jun. 2, 2008

(65) Prior Publication Data
US 2009/0300121 A1    Dec. 3, 2009

(51) Int. Cl.
*G06F 15/82*    (2006.01)
*G06Q 10/10*    (2012.01)
*H04L 29/08*    (2006.01)
*H04L 29/06*    (2006.01)

(52) U.S. Cl.
CPC ........... *G06Q 10/107* (2013.01); *H04L 67/02* (2013.01); *H04L 67/40* (2013.01); *H04L 69/329* (2013.01)

(58) Field of Classification Search
CPC ....... H04L 67/02; H04L 69/329; H04L 67/40; G06Q 10/107
USPC ........................................ 709/203, 206, 250
See application file for complete search history.

(56) References Cited

U.S. PATENT DOCUMENTS

| | | | |
|---|---|---|---|
| 5,764,899 A | 6/1998 | Eggleston | |
| 6,249,807 B1 * | 6/2001 | Shaw ................. | G06F 17/30011 379/256 |
| 6,282,565 B1 * | 8/2001 | Shaw ................... | G06Q 10/107 709/200 |
| 6,476,833 B1 * | 11/2002 | Moshfeghi ..................... | 715/854 |
| 6,691,281 B1 * | 2/2004 | Sorge et al. .................. | 715/234 |
| 6,886,115 B2 * | 4/2005 | Kondoh et al. ................. | 714/52 |
| 6,934,933 B2 * | 8/2005 | Wilkinson et al. ........... | 717/121 |
| 7,006,242 B2 * | 2/2006 | Smith et al. ................. | 358/1.15 |
| 7,032,180 B2 * | 4/2006 | Wilkinson et al. ........... | 715/762 |
| 7,210,100 B2 | 4/2007 | Berger | |

(Continued)

FOREIGN PATENT DOCUMENTS

EP    1420554    5/2004
WO    WO 2006/000850    1/2006

OTHER PUBLICATIONS

A Guide to Building Secure Web Applications: The Open Web Application Security Project by Mark Curphey, David Endler, William Hau, Steve Taylor, Tim Smith, Alex Russell, Gene McKenna, Richard Parke, Kevin McLaughlin, Nigel Tranter, Amit Klien, Dennis Groves, Izhar By-Gad, Sverre Huseby, Martin Eizner, Martin Eizner, and Roy McNamara;Published Mon S.*

(Continued)

*Primary Examiner* — Mohammad A Siddiqi
(74) *Attorney, Agent, or Firm* — Ditthavong & Steiner, P.C.

(57) ABSTRACT

Truncating markup language email messages involves receiving a markup-language-formatted, source email having a message size that exceeds a predetermined size limit. The source email is truncated to conform to the predetermined size limit. The existence of unclosed tags in the truncated email is determined, and a suffix is appended to the truncated email. The suffix includes closing tags that correspond to the unclosed tags to the truncated email. A truncation index indicating where the truncation occurred is added to the message, as is a unique identifier usable to uniquely identify the source email stored on an email server. The truncated email is then sent to a recipient email client.

14 Claims, 8 Drawing Sheets

(56) References Cited

U.S. PATENT DOCUMENTS

| | | |
|---|---|---|
| 7,703,004 B2* | 4/2010 | Bier .............................. 715/234 |
| 2002/0120571 A1* | 8/2002 | Maung et al. .................. 705/42 |
| 2004/0090457 A1 | 5/2004 | Serdy |
| 2006/0218560 A1* | 9/2006 | Dadiomov .............. G06F 9/546 |
| | | 719/314 |
| 2008/0155340 A1* | 6/2008 | Tsun .............................. 714/38 |

OTHER PUBLICATIONS

"Revisiting dictionary-based compression Przemys law Skibi'nski, Szymon Grabowski, Sebastian Deorowicz, Jan. 15, 2005 ; This is a preprint of an article accepted for publication in Software—Practice and Experience Copyright 2005 John Wiley & Sons, Ltd", pp. 1-25.*

Ashley Pond V, "HTML:: Truncate 0.11", 2005.

* cited by examiner

METHOD, SYSTEM, AND APPARATUS FOR TRUNCATING MARKUP LANGUAGE EMAIL MESSAGES

FIELD OF THE INVENTION

This invention relates in general to computer communications, and more particularly to sending and receiving email.

BACKGROUND OF THE INVENTION

It has been useful in the past to truncate plain text emails to avoid sending lots of unneeded data to devices. For example, an email that is the subject of a chain of numerous reply and/or forward actions may have the content of the previous emails of the chain appended to the end of the current email. Email attachments can also make emails grow very large. Some email clients, such as those on mobile devices, may access a truncated version of these long emails when downloading the email to the device.

An email client that truncates a plain text message may download data of an email up to some predefined limit. The full message (or at least the portion that was not downloaded) may be retained on the email server for further downloading if the user so desires. This saves storage space on the client device, and may reduce network/processor bandwidth that would otherwise be needed to download a long email. In such a scenario, the non-downloaded portion may remain on the server, and so it is possible no data is discarded due to the truncation.

When a user replies to or forwards a plain text email that has been truncated, they may want to place additional text in a responsive email formed based on the truncated email. The response email may include the truncated part of the email and other data added by an email client, such as date the original email was sent, the original sender/receiver, etc. Because users often insert new text at the beginning of the email, this works acceptably in most cases. In such a case the user-added text will not affect the form or content of the truncated text.

Plain text emails can be arbitrarily truncated without affecting their rendering, because such messages have no formatting. Even though email is still commonly sent as plain text, other message formats are increasingly used instead of plain text. These other formats can provide features such as font/layout specification, embedded graphics/links, etc. One email message format that includes these features is Hypertext Markup Language (HTML). The HTML specification has its origins in serving Web content, e.g., documents served from Hypertext Transport Protocol (HTTP) servers.

Truncation techniques for plain text may not work reliably with HTML email. Because HTML email is a markup language, HTML documents require certain elements be included in certain orders. Such messages can't be truncated at an arbitrary point and still guarantee that it will be a properly formed markup language document afterward.

Regardless of the difficulties involved in truncating emails, there are benefits in this practice (e.g., reducing bandwidth and storage on clients). Given the increasing use of formatted messages, such truncation should able to handle formatted messages without destroying the characteristics (e.g., formatting) that make these emails so desirable in the first place. Nor should truncation make such documents unparseable by a document renderer. The present disclosure discusses these and other needs in the art.

SUMMARY OF THE INVENTION

To overcome limitations in the prior art described above, and to overcome other limitations that will become apparent upon reading and understanding the present specification, the present invention discloses a system, apparatus and method for truncating markup language email messages. In one embodiment, a method involves receiving a markup-language-formatted, source email having a message size that exceeds a predetermined size limit. The source email is truncated to conform to the predetermined size limit, and the existence of unclosed tags in the truncated email is determined. A suffix is appended to the truncated email that includes closing tags that correspond to the unclosed tags to the truncated email. The method further involves adding to the truncated email: a) a truncation index indicating where the truncation occurred and b) a unique identifier usable to uniquely identify the source email stored on an email server. The truncated email is then sent to a recipient email client.

In more particular embodiments, the method further involves receiving a markup-language-formatted, response email that was formed at the email client based on the truncated email. The response email includes the truncation identifier, the unique identifier, and the suffix of the source email. The source email is retrieved based on the unique identifier and the suffix of the response email is replaced with data from the source email that was removed from the truncated email. The response email is then sent to a targeted recipient. In such a case, the method may also involve determining a second truncated message by repeating the truncation of the source email to conform to the predetermined size limit. In such a case, the data from the source email that was removed from the truncated email is determined based on determining the second truncated message. Also in such a case, the method may also involve verifying that the response message is well-formed according to rules of the markup language after the replacing of the suffix of the response email with the data from the source email that was removed from the truncated email, and before the sending of the response message to the targeted recipient.

In another more particular embodiment of the method, the method further involves receiving a markup-language-formatted, response email that was formed at the email client based on the truncated email. The response email includes the truncation identifier, the unique identifier, and the suffix of the source email. The source email is retrieved based on the unique identifier, and a second truncated message is determined by repeating the truncation of the source email to conform to the predetermined size limit. A second suffix of the second truncated message is determined that includes closing tags that correspond to unclosed tags of the second truncated email. The response email is sent with a message content portion unaltered based on a mismatch between a suffix of the response email and the second suffix. In such a case, the method may further involve including the source email as an attachment to the unaltered response email based on the mismatch between the suffix of the response email and the second suffix.

In another more particular embodiment of the method, the method may further involve adding to the truncated email a selectable object that allows the entirety of the source email to be accessed. In another variation, at least one of the truncation index and unique identifiers are added as an email attribute that is separate from content of the truncated email.

In another embodiment of the invention, an apparatus includes a network interface capable being coupled to a recipient email client via a network. A processor is coupled to the network interface, and memory is coupled to the processor. The memory includes instructions that cause the processor to receive a markup language formatted, source email having a message size that exceeds a predetermined size limit. The processor truncates the source email message to conform to the predetermined size limit and determines the existence of unclosed tags in the truncated email, and appends a suffix to the truncated email that includes closing tags that correspond to the unclosed tags. The instructions cause the processor to add to the truncated email: a) a truncation index indicating where the truncation occurred, and b) a unique identifier usable to uniquely identify the source email stored on an email server. The processor then sends the truncated email to the recipient email client.

In another embodiment of the invention, an apparatus includes a network interface capable being coupled to an email server via a network. A processor is coupled to the network interface, and memory is coupled to the processor. The memory comprises instructions that cause the processor to determine, via the email server, the existence of a markup language formatted, source email targeted for the email client and having a message size that exceeds a predetermined size limit. The processor then downloads a portion of the source email that is used to form a truncated email that conforms to the predetermined size limit, and determines the existence of unclosed tags in the truncated email. The instructions cause the processor to append to the truncated email a suffix that includes closing tags that correspond to the unclosed tags to the truncated email, and to add to the truncated email: a) a truncation index indicating where the truncation occurred, and b) a unique identifier usable to uniquely identify the source email stored on an email server. The truncated message is then sent to the email client.

In a more particular embodiment, the instructions further cause the processor to form a markup-language-formatted, response email based on the truncated email. The response email includes the truncation identifier and the unique identifier of the source email. The processor sends the response email to a recipient, and sending the response email to the recipient causes a truncated portion of the source email to be added to the response email based on the inclusion of the truncation identifier and the unique identifier in the response email. In such a case, forming the response email may involve including in the response email the suffix of the source email, and preventing user editing of a suffix of the response email. In another more particular embodiment of the apparatus, the instructions further cause the processor to add to the truncated email a selectable object that allows the entirety of the source email to be accessed, and facilitate accessing the entirety of the source email based on user selection of the selectable object.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION OF EMBODIMENTS OF THE INVENTION

In the following description of various embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present disclosure is related to automatic truncation of markup language email that is transmitted from an email server to a client. Methods, systems, and apparatuses are describes for truncating an incoming email, forming responsive emails based on the truncated emails, and restoring the truncated portions before sending the messages to their destinations. The present disclosure describes example embodiments that include Hypertext Markup Language (HTML) formatted message. As will be apparent to those of ordinary skill in the art, these concepts will be similarly applicable to other markup languages, including eXtensible Markup Language (XML), Standard Generalized Markup Language (SGML), eXtensible HTML (XHTML), etc.

To truncate a markup language message, an apparatus handling the message scans the message up to the point of truncation, keeping track of any open tags. The message is then appended with any needed closing tags so that the truncated message remains valid according to the rules of the markup language. Later, when replacing the original, an apparatus can compare the end of the outgoing email to the replacement ending previously formulated. If the two still match, it may be possible to remove the substitute ending and restore the original ending. In many cases, this still allows for editing of the truncated message by the user and having the truncated message properly expanded to its presumptive modified form (e.g., the message's final edited form as if no truncation were performed).

Figure 1:
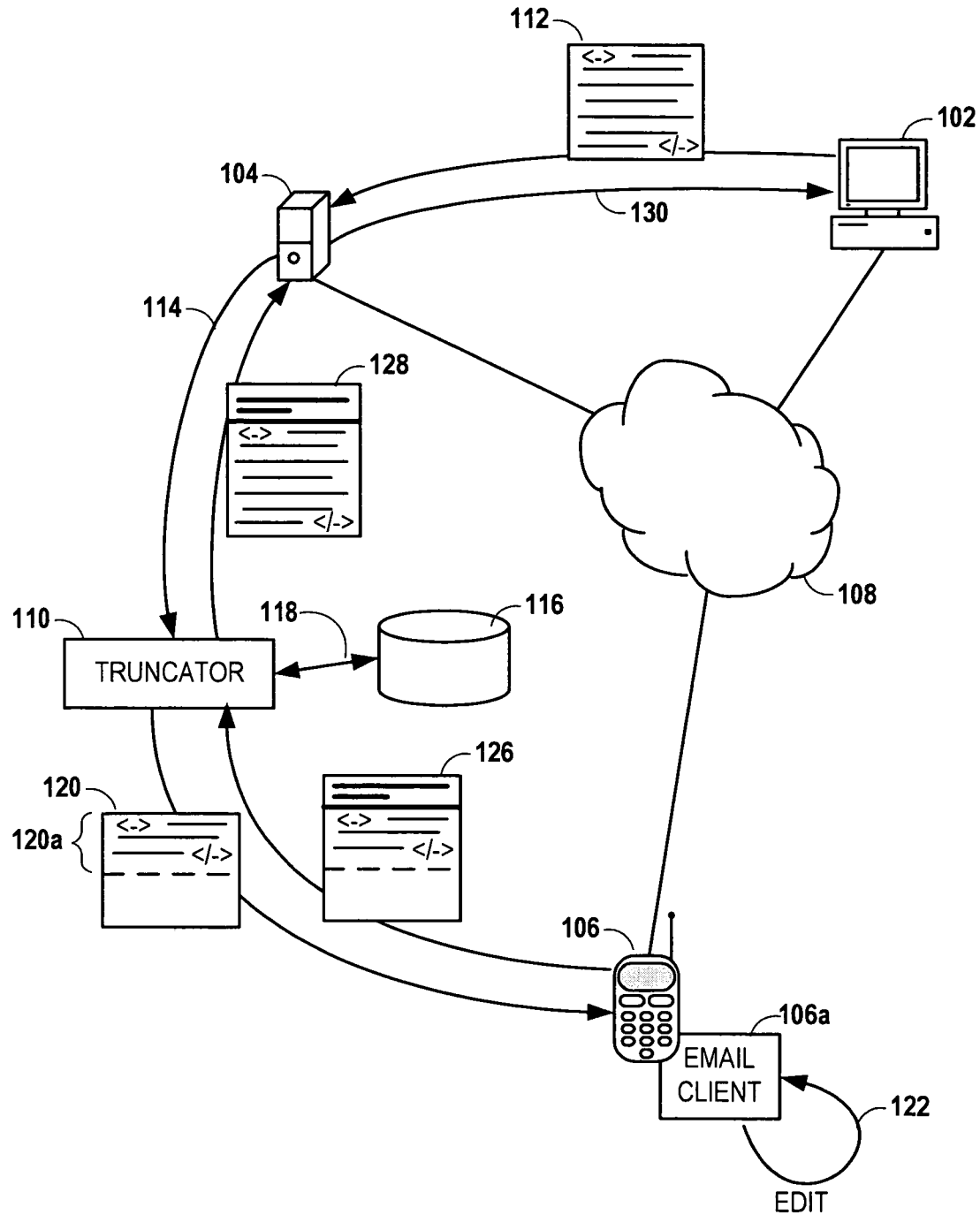
FIG. 1 is a block diagram illustrating a system according to embodiments of the invention.

In reference now to FIG. 1, a block diagram illustrates a system according to an embodiment of the invention. The system includes an email sender device 102, an email server 104, and an email receiver device 106 coupled via one or more networks 108. The devices 102, 104, 106 may be coupled to perform email exchanges as known in the art, and such exchanges may involve additional components not shown, such as intermediary mail servers, routers, firewalls, etc. For the purposes of this discussion, the email server 104 may at least be configured to act as a mail transfer agent (MTA) on behalf of the receiving device 106, which may be acting as a mail user agent (MUA). As such, the email server 104 and receiving device 106 may interact using standard MTA-MUA protocols as Post Office Protocol (POP) and Internet Message Access Protocol (IMAP), or non-standard/proprietary protocols.

The illustrated receiving device 106 is shown as a mobile device, and therefore may be representative of devices that benefit from truncating inbound email messages (e.g., due to storage, processing, and bandwidth limitations). However, it will be appreciated that non-mobile devices may benefit from email truncation in some situations. For example, an email receiving computer having plentiful processing power and storage, but a low-bandwidth connection (e.g., dial-up connection) to the server 104, may benefit from truncating long messages. In such a case, an email client could allow the user to preview and/or delete large, unwanted messages without having to entirely download the messages first.

In order to truncate long email messages, the system includes a truncator component 110. The truncator 110 may run on any system component that processes email messages, including the server 104 or client 106. Generally, the system will have provisions for keeping the original, untruncated message on the server 104. The capability to instruct the server to retain a message already exists with protocols such as POP and IMAP, and therefore a client-located truncator 114 may still operate to truncate messages from unmodified servers without having to download the full message. However, in order to reassemble messages, there may be benefits in implementing some or all of the truncation function 110 on the server 104, as the server 104 may have ready access to the original message.

In one scenario, the sending client 102 sends a markup language formatted message 112 either directly or indirectly to email server 104. In many situations, the client 102 may send the device to an intermediary MTA (not shown) that would store the email 112 and forward it to MTA 104 via Simple Mail Transfer Protocol (SMTP). After receiving the message 112, the server 104 may send the message to the truncator 110 for processing, as indicated by path 114. At this time, the truncator 110 and/or server 104 may further cause at least one copy of the original message 114 to be stored in a persistent data store 116 as indicated by path 118. This data store 116 may be part of the standard email storage of server 104, or a special data store managed by server 104 and/or truncator 110.

The truncator 110 processes the original message 112 to produce a truncated message 120. Generally, the truncated message 120 includes a leading portion 120a that may be copied verbatim from the original message 112. At a pre-determined point/place (e.g., corresponding to a predetermined message size) in the message 112, copying from the original message stops and any required closing tags are added that are required to make the truncated message valid according to the rules of the message's markup language.

The size of the resulting truncated message 120 may be equal to or larger than the predetermined maximum size of messages to be passed to the receiving client 106. For example, if the maximum size of the message is 1000 bytes, the truncator 110 could read the original message 112 up to the $1000^{th}$ byte, and then add any needed closing tags, in which case the resulting message could be somewhat greater than 1000 bytes. In another example, the truncator 110 could, for any messages over the size limit, begin counting bytes from the beginning of the message, and for any opening tags, add in the number of bytes needed for both the tag itself, and for any closing tags that might be needed. So, assuming one byte per character, a truncator encountering the tag "<b>" would add the 3 bytes for the tag itself to the count, plus 4 bytes for the closing tag "</b>." If the closing tag (e.g., "</b>") is encountered before the end of the maximum limit, those bytes would be subtracted from the count. Some tags (e.g., "<br>") do not require a closing tag, and so could be treated as regular text.

The size of the resulting message may also be dependent on whether the termination of the size limit occurs within a markup language tag. Any termination of the truncated message may require terminating either before or after this tag, so as not to split the tag itself. It may be preferable to ensure the splitting point for truncating the file occurs within "content" as much as possible, and therefore does not require determining how to properly deal (e.g., split or not to split) with lengthy markup elements, including tags, scripts, comments, etc.

The truncator 110 may also add data to the truncated message 120 that defines where in the message the truncation occurred (e.g., a truncation index) and where the original, untruncated email 112 might be located (e.g., a unique message identifier). As will be explained in greater detail below, this data can be used by an intermediary (e.g., server 104) to later add the truncated data to any responsive emails sent by the client 106 that are formed based on the truncated message 120. One or both of the truncation index and unique message identifier may be inserted in a non-content part of the message 120, such as message attributes, RFC-822 headers, metadata, etc. The truncation index and/or unique message identifier may be inserted in a content portion of the truncated message as well, e.g., using a Uniform Resource Locator (URL), HTML comment, script, etc. In other embodiments, a truncation flag may be placed in message content/attributes, and the truncation index and/or unique message identifier may be obtained outside of the message, e.g., via a URL, retrieved from server, etc. It will be appreciated that in the latter case, the message 120 may require some sort of unique identifier to be used to obtain the truncation index and/or unique message identifier, as these may be unique to this particular message 120.

After processing by the truncator component 110, the truncated email 120 is sent to a client program 106a in device 106 where it can be viewed by the user. The client program 106a, or the message 120 itself, may provide indicators to the user that the message 120 is truncated. For example, the client program 106a (or formatting inserted into the message 120) may visually highlight truncated messages and provide a control (e.g., hyperlink, button, Javascript™ object) that causes the remainder of the full message 112 to be downloaded/viewed by the client 106a or elsewhere (e.g., viewed via a browser).

In many instances, the user may wish to edit the truncated message 120, as indicated by path 122, to form a response message. This may involve forwarding the message, in which case additional data (e.g., date, original sender and recipients) may be prefixed to the message body. In another case, the user may use the original reduced message 120 as a basis for a forward/replay, and further wish to add comments either at the top of the message 120, or by inserting into visible lines 120a of the truncated message 120. These edits are represented as edited reduced message 126 that is sent via the truncator processor 110 for further processing.

The edited message 126 may be expanded by the truncator 110 automatically or based on a user signal. For example, the reduced message may end with text such as: "—Message truncated by server; click here to retrieve the full message or delete this text to prevent truncated portion from being included in replies/forwards—." Thus if the user did nothing, the truncated portion would be restored in the edited message 126, as represented by restored edited message 128.

Generally, when creating the restored message, the truncator 110 may combine the stored message (e.g., 112) with the truncated and edited message 126 in such a way that the resulting message 128 resembles what the original message 112 would have looked like if editing actions 122 were applied to the message 112 without truncation. In this example, the restored message 128 is sent back to the original sender 102, as represented by path 130. In other cases, the message could be routed to other destinations besides sender 102, including the targeted device 106 itself (e.g., sender copied himself/herself on the message). In the latter case, the server 104 and truncator 110 may have to decide which version of the message 126, 128 to send back to the client 106, or may create a new truncated message based on restored message 128.

Figure 2:
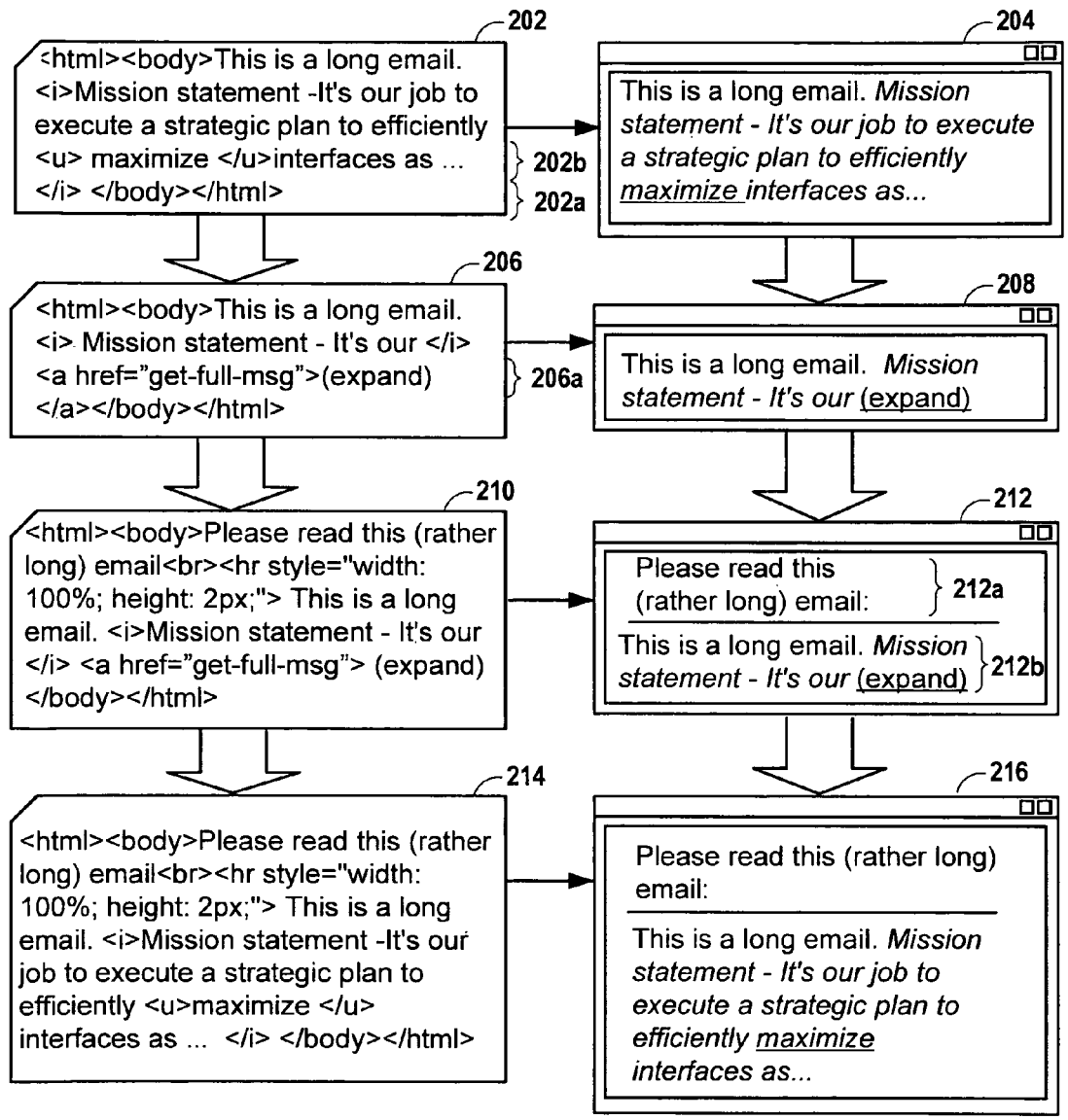
FIG. 2-3 are block diagrams illustrating handling responses based on truncated messages according to an embodiment of the invention.

In reference now to FIG. 2, a block diagram shows an example of how message truncation and restoration may proceed according to an embodiment of the invention. Generally, the left side of FIG. 2 indicates HTML code that forms a sequence of email messages, and the right side represents how the respective HTML code would be rendered in a user program. For example, block 202 represents the HTML of a sent message, and block 204 represents how the rendered message would appear in an HTML rendering engine.

For purposes of this example, it may be assumed that the text of the sent message 202 exceeds a maximum size specified for a recipient, in which case a system node (e.g., truncator 110 shown in FIG. 1) may form a truncated message 206, which appears as rendered message 208. In this example, the original message 202 is truncated after the text "It's our." After this truncation point, the original message 202 contains three more closing tags, namely the string "</i></body></html>" seen at line 202a. It should be noted that the closing tag "</u>" on line 202b is not considered in this truncation, because the opening tag "<u>" associated with that closing tag is also truncated.

In the illustrated truncated message 202, a suffix containing the final closing tags (e.g., 202a) may be appended as is (e.g., "</i></body></html>" in this example). An optional modification/addition as seen in line 206a may be made to the suffix. In this line 206a, an anchor tag ("<a>") and the parenthesized text "expand" is inserted before the close of the message body (e.g., before the "</body>" tag). This extra data 206a (as well as closing tag "</a>" seen on the next line) may serve two purposes: a) communicate that the email was truncated at this point, and b) provide a way to get the full message if desired, such as by including a unique reference to the original message. In the latter case, selecting the link in this example will cause access of the "get-full-msg" URL designated by the "href" attribute, which may cause the mail client or some other program to retrieve and display the remaining text.

It will be appreciated that other implementations may be used to indicate a truncated message and obtain the full text of the message. For example, the selectable link may allow the user to determine that the message was truncated, while another, non-viewable marker more suitable for machine reading is inserted to index the truncation point. Such a marker may be included in the message content, header attributes, or be externally retrieved on demand.

As described in the previous scenario, the user may want to edit a truncated message by adding text. This is shown in message 210, which is rendered as message 212. The user in this example has added text 212a to the message 212. Note that in this view 212, the truncated version of the message is seen in the bottom 212b of the message 212. In one arrangement, leaving this lower portion 212b alone will automatically cause the truncated part to be added again when the message is sent. The message text 214 and associated rendered view 216 show the result of adding the truncated data to message 212, as might be seen by the recipient of the restored message 214, 216.

As mentioned above, assuming the user leaves the lower text 212b alone when editing a response or forwarded message, the system component that handles truncation and re-assembly may automatically re-insert the truncated portions of the original message 202. In such a case, the user may signal that such reinsertion not occur by deleting part of the lower text. In other cases, the email client that renders messages 208, 212 may detect the truncation via email content, attributes and/or headers, and include a control (e.g., checkbox) that allows the user to signal whether or not to reinsert the truncated portions.

In this example, the deletion of the "expand" hyperlink seen in views 208 and 212 (which will delete underlying code shown, in part, at line 206a) may be one way to accomplish that the truncated text is not to be re-inserted. In some cases, any changes in the suffix of message 210 that make it appear different than original truncated suffix may cause the reassembly component to forgo restoring the truncated data. In other cases, the re-assembly component of the system may scan the message 210 looking particular text such as the "expand" hyperlink, and add the truncated portion based on finding the string. In such a case, the URL may need to be globally unique so as not to be confused with other data in the message. The term "globally unique" may include a randomly-generated string sufficiently long enough that probability of the same string being generated twice (or intentionally included in message text) is very small. Such unique identifier could be included as part of a URL of a hyperlink, HTML comment, script, XML code, or any other markup/formatting data known in the art.

Figure 3:
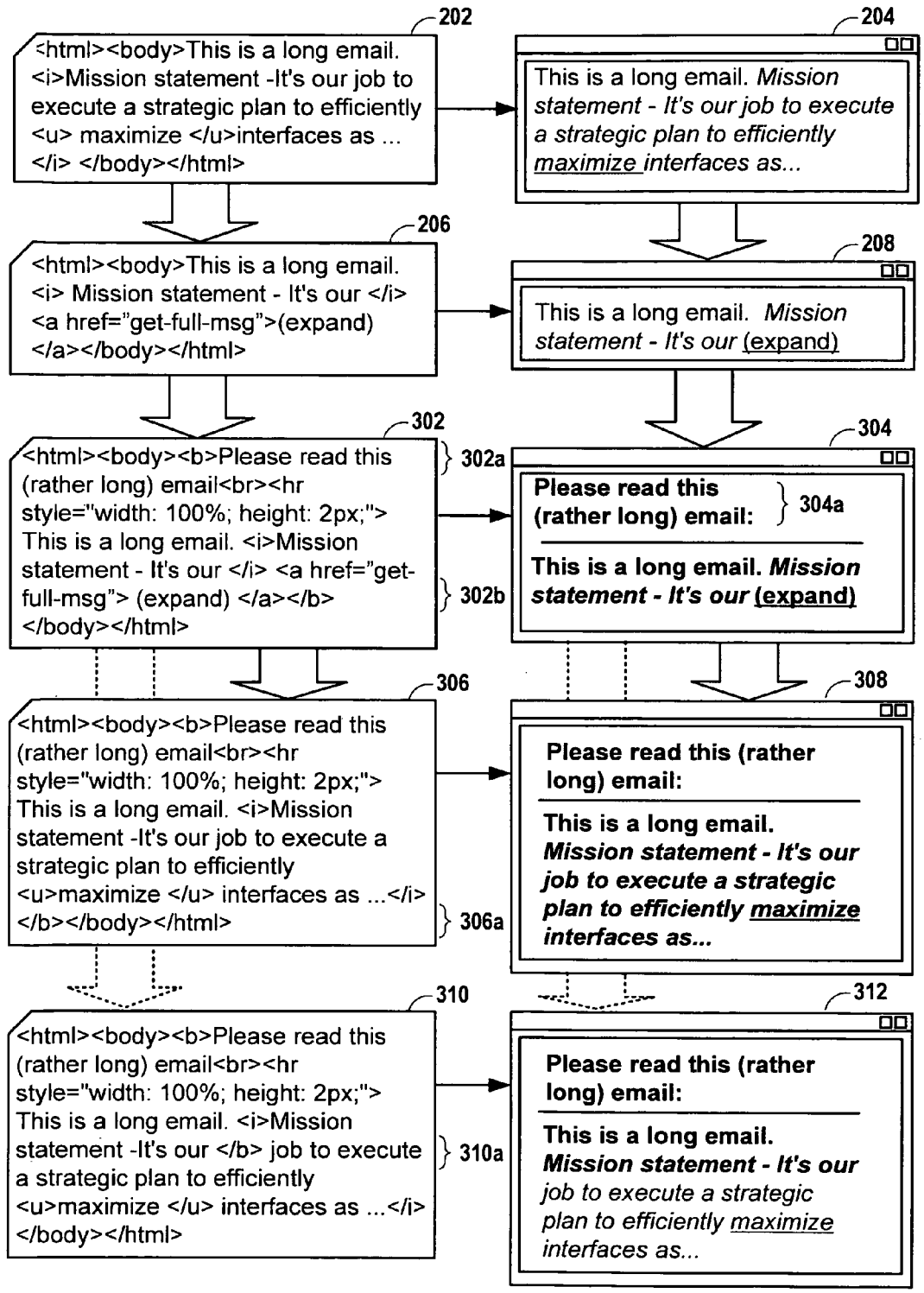

It will be appreciated that a user may apply other edits beside prefixing a message with text such as seen in by inserted text 212a in view 212. In reference now to FIG. 3, a block diagram illustrates how post-truncation modifications to original text may be handled according to embodiments of the invention. In FIG. 3, the same reference numbers are used to indicate analogous features as shown and described in relation to FIG. 2. In particular, a long email 202, 204 is truncated to form message 206, 208. The user has made an edit to the truncated mail that can be seen in HTML code 302 and in message view 304.

In this example, in addition to adding prefix text 304a, the user has set the entire message 304, including the truncated portion, as boldface font. This can be seen by the "<b>" and "</b>" tags on lines 302a and 302b, respectively. The "</b>" tag is inside the extra data added during truncation. If a truncator component simply deletes everything in this message 302 after the truncation point (right after the text "It's our") and substitutes the truncated text, then the "</b>" tag on line 302b will be left out, and the resulting document will not be well-formed according to the rules of HTML.

One way of dealing with this type of edit is to recreate the suffix of the truncated message (e.g., everything after "It's our" in message 206) based on the original message 202 stored at a server. The recreated suffix is compared to the suffix of the response message 302 (e.g., everything after "It's our" in message 302). If there is a mismatch, no attempt is made to expand the message further. In such a case, the message 302 may be sent as is, or the original message 202 can be inserted as an attachment.

In this particular case, many HTML parsers may be forgiving of a missing "</b>" tag, and may render all text as bold until the end of the document. In other cases, such as forming a table using tags "<table>," "<tr>," "<td>," etc., the results may be less predictable. Another way to deal with user edits that may cause problems in expanding the message is to parse the resulting message in an HTML parser, thereby detecting whether the resulting code is well-formed HTML. If the message is not well-formed, instead of trying to recreate the message, the original message 202 can be included as an attachment to the reply 302. Another option is to attempt to recreate any user added data in the final result, as shown in example expanded message 306 that is seen in view 308.

In expanded message 306, the truncator component has detected a difference between the added data (e.g., everything after "It's our") in message 206 and the same portion in edited message 302. Tools to perform text comparison are well known in the art (e.g., the Unix "diff" command) and can be used to specify changes to target data. In message 306, the truncator has detected that, between the post-truncation data (e.g., everything after "It's our") in messages 206, and 302, the only difference is the closing tag "</b>." Thus this difference data is inserted at line 306a, right before the end of the message body.

An alternate decision is shown in expanded message 310, which is shown rendered in view 312. In this case, the truncator component has inserted any "extra" data (which could include user-added text and/or editor-added tags) right after the truncation point, seen on line 310a. In this example, either resulting view 308, 312 may be acceptable to the end user. The choice of which action to take, including sending the original text as an attachment or not expanding the message, may involve the particular HTML features supported by the email editor/viewer, user preferences, system performance, and other factors that will be evident to system and software designers in implementing such a system.

Figure 4:
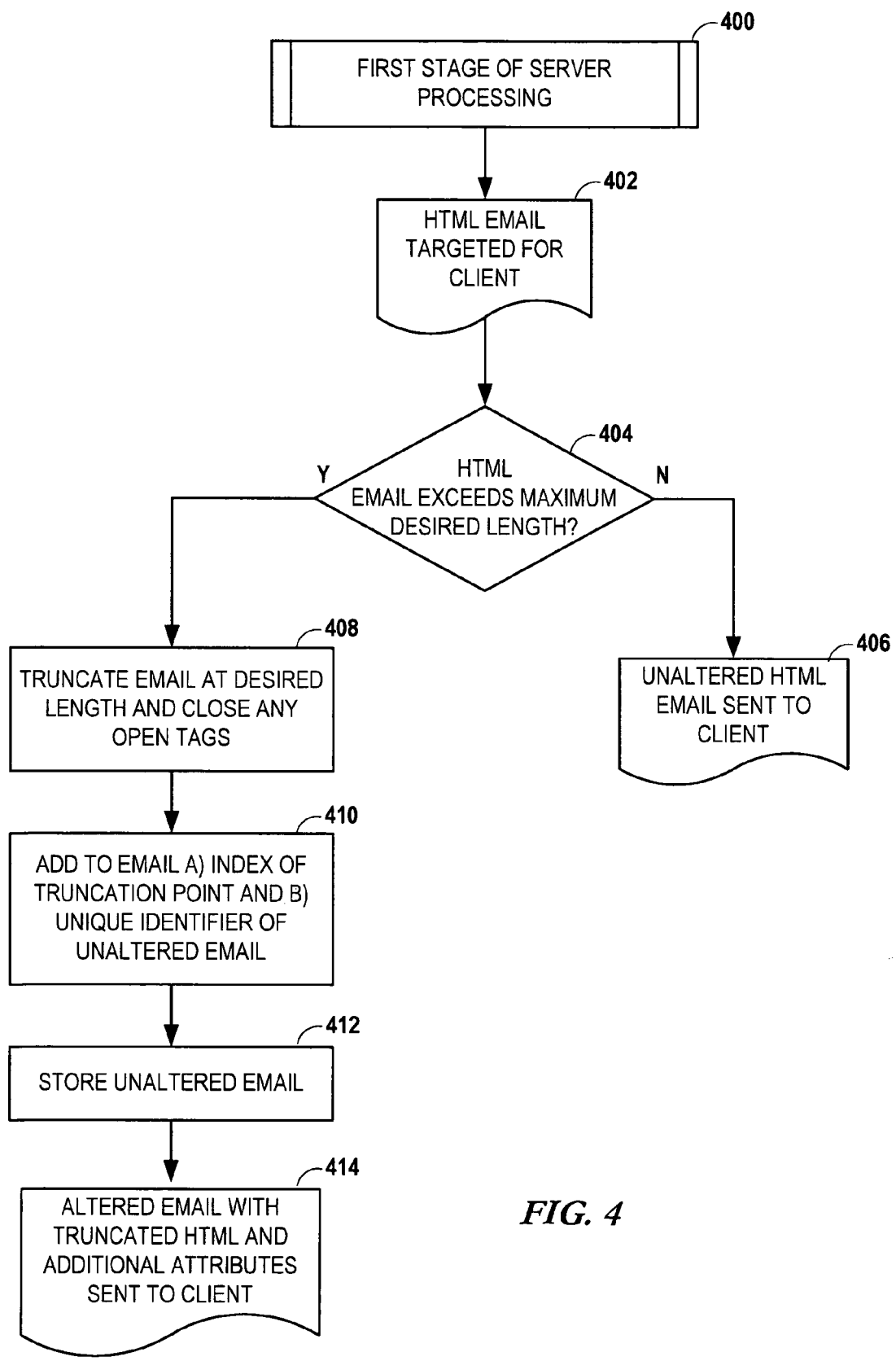
FIGS. 4-6 are flowcharts describing procedures according to embodiments of the invention.
Figure 5:
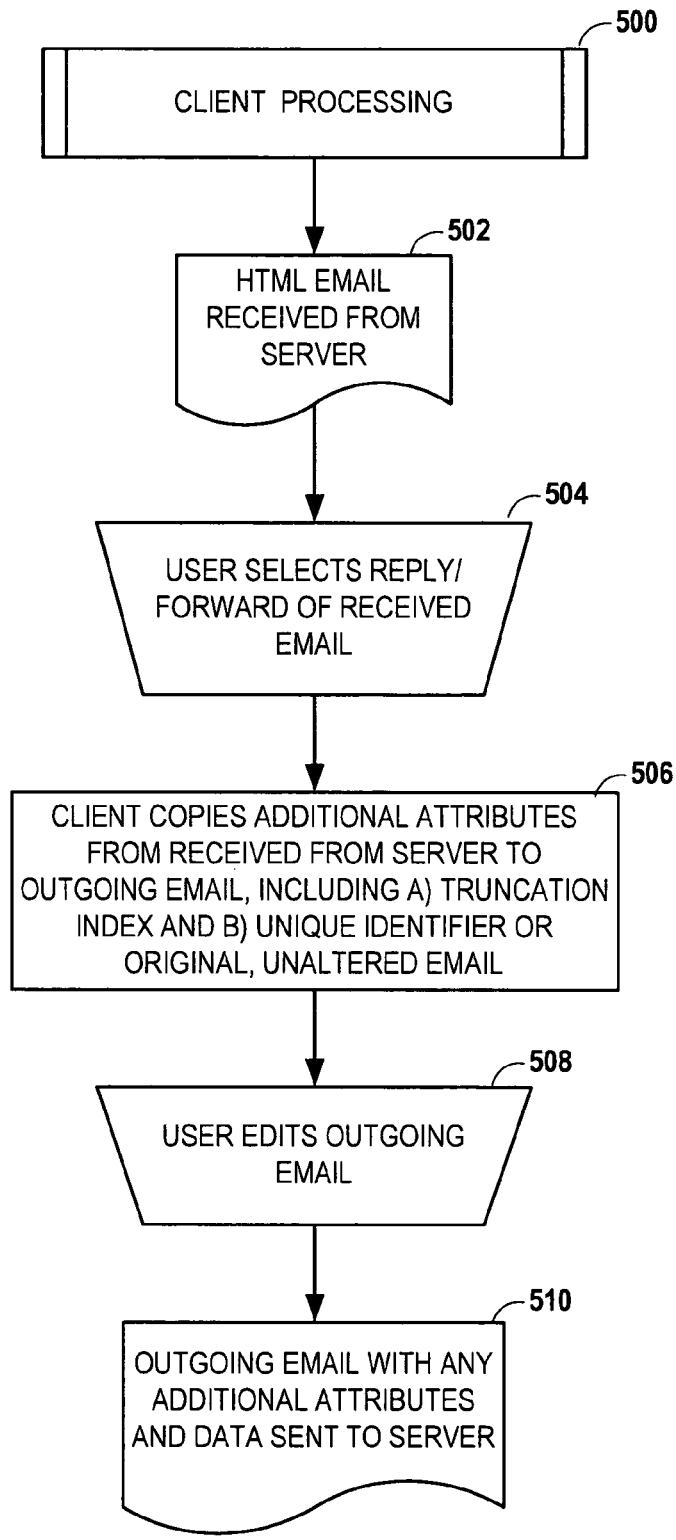
Figure 6:
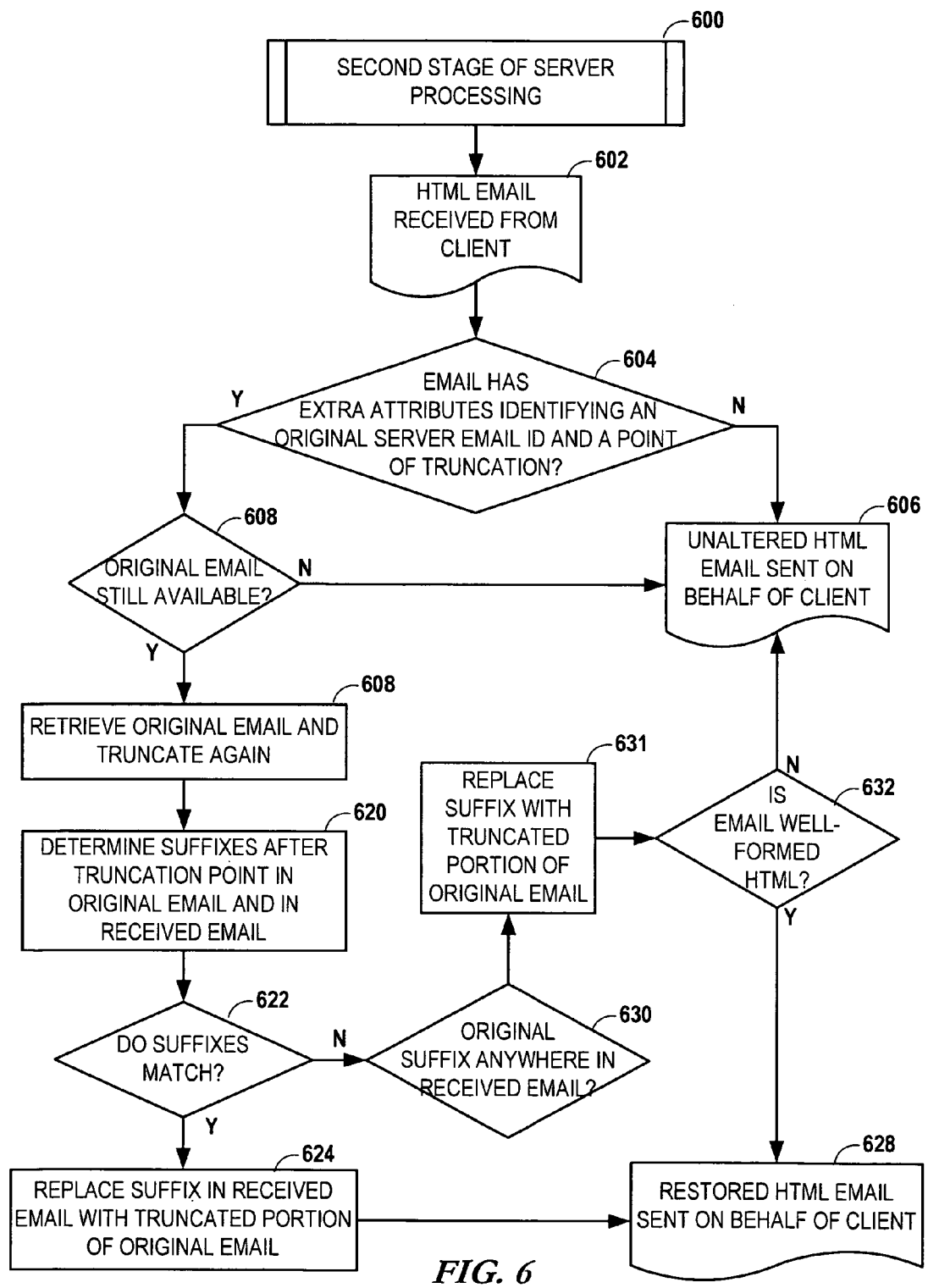

In reference now to FIGS. 4-6, a series of flowcharts illustrate email truncation and restoration according to embodiments of the invention. Turning first to FIG. 4, a procedure 400 of first stage server processing involves receiving 402 an HTML formatted email targeted for a client. A determination 404 is made whether the received message exceeds a maximum desired length. The maximum desired length of a message determined at 404 may be user and/or system defined.

If the email does not exceed the desired length, the unaltered email is sent 406 to the client. If it is determined 404 that the email size exceeds the desired length, the email is truncated 408 to the desired length and any open tags are closed. The truncation 408 may take into account the length of the closing tags, so that the size of the truncated message does not exceed the desired size after adding in the tags and other data. The truncation 408 may also make special considerations if the truncation point falls within tags or other special data (e.g., scripts). For example, the truncation point may be moved back or forward so as not to divide any HTML tags.

After truncation, the truncated email is augmented 410 with an index (or similar data) that indicates the truncation point, and a unique identifier of the unaltered email. The index and identifier can both be used later for reassembling the truncated portions of the email if the email is forwarded or replied to. This index and identifier data may also have other uses, such as allowing the user to retrieve the full message for viewing on the client. After processing 410 the truncated message, the unaltered email can be stored 412 for later use, and the truncated email is sent 414 to the client.

The determination of message size 404 and subsequent steps may be performed at an email server, and/or by some other intermediary truncator component between an email server and email client. For example, a client and server component could cooperate to divide the illustrated operations between the client and server.

In some cases, a client-only implementation may be able to perform the indicated actions in FIG. 4 via an unmodified POP or IMAP server. For example, a POP server should support a "LIST" command which returns list of message numbers followed by the exact size of the message in octets. This can be used to determine message size as in operation 404 described above. The POP server may also support a "TOP msg n" command, which allows a client to retrieve the top "n" lines of message number "msg." This may be used to obtain the non-truncated part of the email message (part of operation 408), albeit by specifying number or lines, and not by specifying number of bytes or octets. However, such a client-only implementation might need to later download the entire message from the POP server if it is desired to reconstruct the message for purposes of replying to or forwarding the original message. Alternatively, a specially modified outgoing server (e.g., SMTP server) used to send the truncated mail may be modified to perform such reconstruction by accessing original email at the POP server, thus still allowing the system to utilize an unmodified POP server with a modified SMTP server.

In FIG. 5, a procedure 500 illustrates how a client may receive and facilitate editing a truncated HTML email according to an embodiment of the invention. An email that has been truncated (e.g., as described in relation to FIG. 4) is received 502 from the server. The user selects 504 an email response option such as reply or forward. In response to the user selection 504, the client copies 506, into a new email, the additional attributes that were added to the truncated email by the server. Such attributes may at least include the truncation index and unique identifier if the original email described in reference to FIG. 4.

The client presents this copy of the email for user editing 508. Typically this editing 508 may involve prefixing the existing message with the user's own text and formatting. The user may also insert text and/or formatting into the parts of the original message that were not truncated before being received 502 by the client. This will allow the user, for example, to insert inline comments to the non-truncated part of the original message.

The client may have provisions to prevent editing of the additional attributes added to the end of the message by the truncator service (e.g., closing tags, index mark, identifier of original full email). Editing these attributes may include inserting data into the attribute block, deleting some or all of the attribute block, and adding data after the attribute block. In some cases, allowing the user to modify the attribute data may be beneficial. For example, if the user is allowed to delete an index part of the attributes (which may appear in part to the user as a hyperlink or content object), this may allow the user to prevent the truncated data from propagating in the email chain. However, if too much leeway is given to the user in editing the attribute data, it may be more complicated to re-compose the truncated portions of the message by the service that receives the message sent at 510.

In reference now to FIG. 6, a procedure 600 illustrates how an email server (or other intermediary service) may receive and re-expand a truncated HTML email according to an embodiment of the invention. An email that may have been truncated and then edited (e.g., as described in relation to FIGS. 4 and 5) is received 602 at the server and/or an intermediary entity that may have access to the originally truncated email. The component/server determines 604 whether the message contains attributes that indicate this message was automatically truncated. Those attributes may include an ID of the original email and a point of truncation within the email. If no attributes are found, then the message is sent 606 unaltered.

If the truncation attributes are found, then a check 608 is made to determine whether the original email is still available. If so, the original email is retrieved and a similar truncation 608 is performed. If the original truncation (e.g., step 408 in FIG. 4) and this truncation 608 were performed by different entities (e.g., client-server, different servers), then coordination between the entities (e.g., indication of version numbers, common rules database) may be needed to ensure the same truncation techniques are used in both instances. The result of this truncation 608 is that the service can now determine what the suffix of the original email should be.

The suffix determined from the truncation 608 is compared 620 with the suffix of the received email 602. If the suffixes are the same, then the suffix in the received message 602 can be replaced 624 by the formerly discarded portion of the truncated email, and the restored message 628 can be sent to its target on behalf of the client with some assurance that the resulting message is properly formed.

If it is determined 622 that the recreated suffix and actual suffix in the present message are different, it may be desirable to simply send the unaltered message 606. However, it may be possible to determine 630 that the suffix determined via truncation 608 is located somewhere within the received email 602, even though some extra data may have been added so that the matching 622 fails. This may occur, for example, where the email client has inserted a closing tag in the suffix such as shown in FIG. 3. In such a case, the entity may try to recreate 631 the message by replacing the text block containing the suffix with the formerly discarded portion of the truncated email. Any extra data that caused the match 622 to fail may be discarded, or may be inserted at an appropriate point (e.g., right after suffix, just before closing tags of message body). If an HTML parser determines 632 that the resulting message is well-formed, then it may be sent 628 in its restored form, otherwise the unaltered version is sent 606.

As described above, a network component that truncates and reassembles long HTML emails may be useful for some email clients. In reference now to FIG. 7, a block diagram illustrates a client apparatus 700 that, in one embodiment of the invention, may perform any combination of email client and truncation functions in cooperation with email servers. The client apparatus 700 may be a mobile or non-mobile device. For example, the illustrated functionality may be advantageously implemented in mobile devices such as cell phones, Personal Digital Assistants (PDA), media players, navigation units, etc.

The apparatus 700 includes a processor 702, memory 704, and an I/O bus 706 that couples peripheral devices to the processor 702. Those peripheral devices may include persistent memory storage 708 (e.g., disc drives, flash memory), one or more network interfaces 712, and a media reader 710 (e.g., tape reader, floppy drive, Compact Disc player, Digital Versatile Disc player, memory card reader, etc.). The media reader 710 is capable of reading from a storage medium 714, such as optical or magnetic media. The media reader 710 may also be capable of writing to the media 714. The network interfaces 712 may be capable of communicating via one or more networks 716. The network 716 may utilize media such as phone lines, coaxial cable, Ethernet, wireless radio transmissions, infrared transmissions, etc. The network 716 may include Internet Protocol (IP) based public and private networks (including the Internet), as well as proximity networking such as Bluetooth, WLAN, UWB, WiBree, and IrDA.

The operation of the processor 702 is dictated by instructions 718 that may be stored temporarily or permanently in memory 704 or other logic circuitry. The instructions 718 may be built into the apparatus 700 during manufacture, or may be later transferred to the apparatus 700 via the storage media 714 or the networks 716. The instructions 718 may include one or more network protocols modules 720 that facilitate communicating via the network 716 using common network protocols such as TCP/IP, UDP/IP, etc. An email client 722 may communicate with a network-coupled email server 724 via the protocol stack 720 using standard or proprietary mail transfer protocols known in the art (e.g., POP, IMAP, Exchange™, SMTP, Web service remote procedure calls, etc.).

The email client 722 may also be configured to use special adapter interfaces 726, 728 that operate to respectively truncate and re-assemble markup language based email messages. These interfaces 726, 728 are optional, as all of the truncation and re-assembly operations can be performed wholly on the server 724 or some other intermediary network entity. Generally, the truncator interface 726 can manage operations such as the downloading and flagging of truncated emails, providing user-requested access to the full email, marking the original version of truncated emails on the server 724 for non-deletion, etc. In some instances, the truncator interface 726 may perform the actual truncation operations, such as downloading a predetermined leading portion of a an email, adding markup language tags to the truncated content, and adding content to the truncated email that allows the truncation point to be determined and the original email to be located on the server 724.

The optional re-assembly interface 728 may perform actions that do not require synchronization with the server 724, such as checking server-added suffixes of truncated emails to ensure the suffixes were not modified by the user. In other implementations, the re-assembly interface 728 may interact with the server 724 for restoring truncated parts of original emails that are being forwarded or replied to. For example, a proprietary outgoing interface may support command such as "append bytes 1001-4000 of email x to bytes 0-1200 of this email and send to listed recipients." In such a way, the logic that defines how to re-assemble a given message may reside entirely in the apparatus 700, even when actual re-assembly may occur on the server 724.

The email client 722 may include the interfaces 726, 728 as part of its included functionality, or the interfaces 726, 728 may be added by way of an extension or plug-in architecture of the client program 722. Besides governing server side interactions of the client 722, the interfaces 726, 728 may also provide user interface functions. For example, the interfaces 726, 728 may govern viewing and editing actions of truncated messages, provide help screens, etc.

The interfaces 726, 728 and email client 722 may be governed by locally stored settings as represented by preferences 730. For example, a user preference 730 may state that the truncated emails are/are not automatically expanded if the user does not state otherwise. If some of the truncation/re-assembly operations are performed locally, the device 700 may include a database 732 of email IDs. These IDs 732 may be useful for expanding truncated emails that are replied/forwarded, and may assist in performing other useful maintenance tasks, such as signaling the server 724 to delete originals of emails when the truncated version(s) are deleted from the local device 700.

The operations involved in truncating emails may be governed by a rules database 734. These rules 734 may include rules of the markup languages of emails, such as might be used by a markup language parser 736 utilized by any of the email client 722 and interfaces 726, 728. Other rules 734 might govern how message sizes are determined for truncation (e.g., whether to include the size of appended tags and other data in suffixes), how to deal with a truncation point lying within a markup language tag, localization of appended informational text, etc. These rules 734 may be mirrored and/or augmented by similar rules 738 accessible via the server 724.

As described above, an email client may operate with a server to truncate long hypertext formatted emails received on behalf of a client and re-assemble the truncated portions under some conditions. In reference now to FIG. 8, a block diagram illustrates a server apparatus 800 that may perform any combination of services according to embodiments of the invention described herein. The apparatus 800 may include a processor 802, memory 804, and an I/O bus 806 that couples peripheral devices to the processor 802. Those peripheral devices may include persistent memory storage 808, one or more network interfaces 812, and a media reader 810. The media reader 810 is capable of reading from storage media 814. The media reader 810 may also be capable of writing to the media 814. The network interfaces 812 may be capable of communicating via one or more networks 816 (e.g., local networks, the Internet).

The operation of the processor 802 is dictated by instructions 818 that may be stored temporarily or permanently in memory 804 or other logic circuitry. The instructions 818 may be built into to the apparatus 800 during manufacture, or may be later transferred to the apparatus 800 via the storage media 814 or the networks 816. The instructions 818 may include one or more networking protocol stacks 820 for common network protocols such as TCP/IP, UDP/IP, etc. The network protocol stack 820 in turn utilizes the network interface 812 for accessing the networks 816.

The instructions 818 may include legacy email interfaces 822, 824 for managing respective incoming and outgoing email sessions with email clients 826. These email interfaces 822, 824 may be replaced with or augmented by a custom/proprietary email interface 828. This latter interface 828 may be able to natively and actively manage message truncation and re-assembly operations with clients 826 as described herein.

The instructions 818 may include specific operational modules 830, 832 for respective truncation and re-assembly operations of markup language emails as described herein. For example, the truncation module 830 may intercept client emails routed to clients 826 via client access interfaces 824, 828, determine whether such emails exceed a predetermine size limit, truncate the email and add additional data so that the messages remain well-formed. The re-assembly module 832 may intercept emails sent from clients 826 via interface(s) 822, 828, determine whether such emails require re-assembly, access the originally truncated data, and reassemble the incoming mail to be a representation of what the incoming message would look like if it were not originally truncated.

The functional modules 828, 830, 832 may be governed by locally stored or remotely determined user settings as represented by configurations 834. For example, the configurations 834 may define predetermined sizes for truncation that are defined on any combination of user identity, device type, account type, provider identity, etc. The device 800 may include a database 836 of email IDs for accessing data used to expanded truncated emails that are replied/forwarded. The operations involved in truncating and re-assembling emails may be governed by a rules database 838. These rules 838 may include rules of the markup languages of emails, such as might be used by a markup language parser 840 that may be utilized by any of the functional modules 828, 830, 832. Other rules 838 might govern how message sizes are determined for purposes of truncation (e.g., whether to include the size of appended tags and other data in suffixes), how to deal with situations such as a truncation point lying within a markup language tag, localization of appended informational text, etc.

Figure 7:
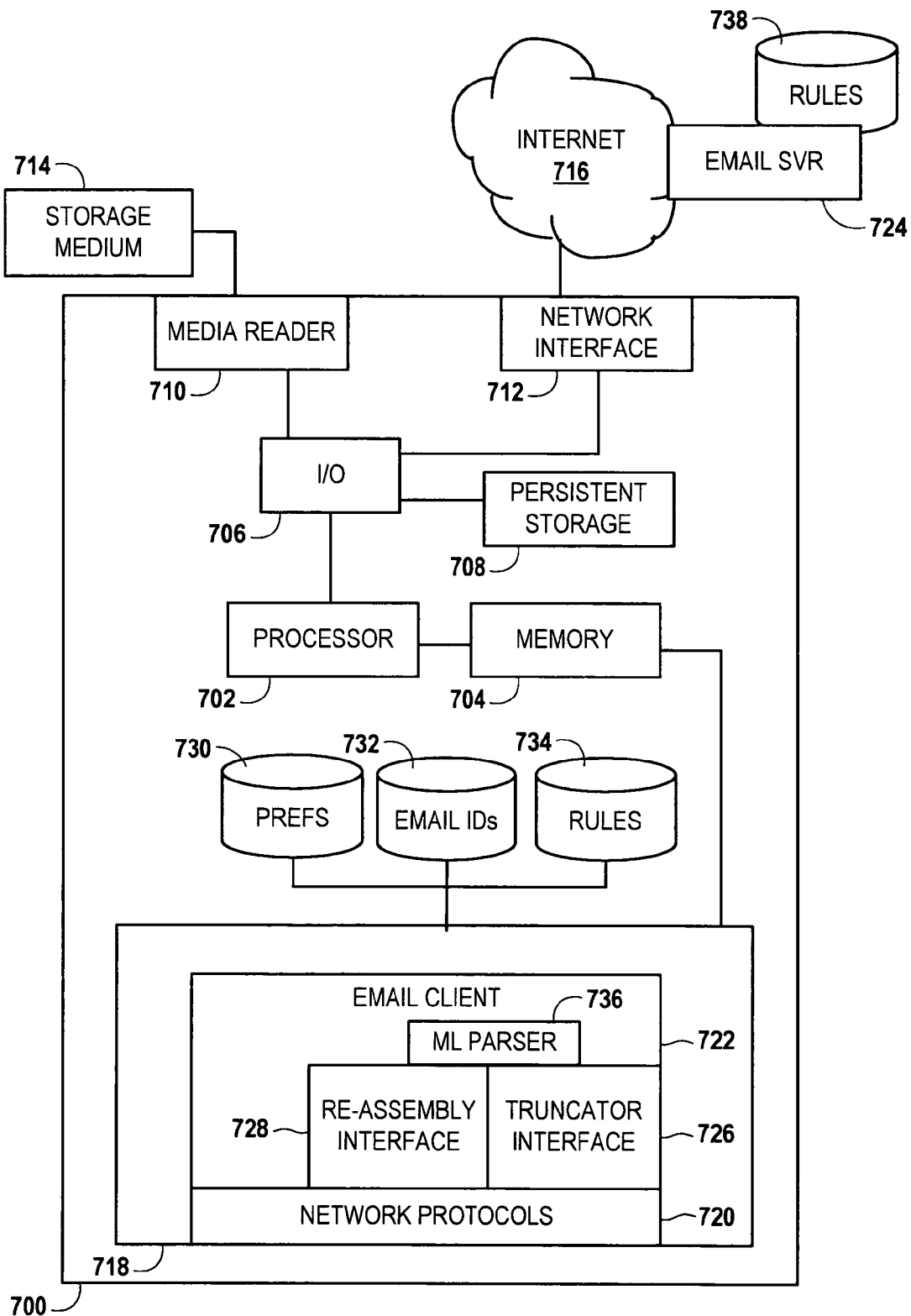
FIG. 7 is a block diagram of a client apparatus according to an embodiment of the invention.
Figure 8:
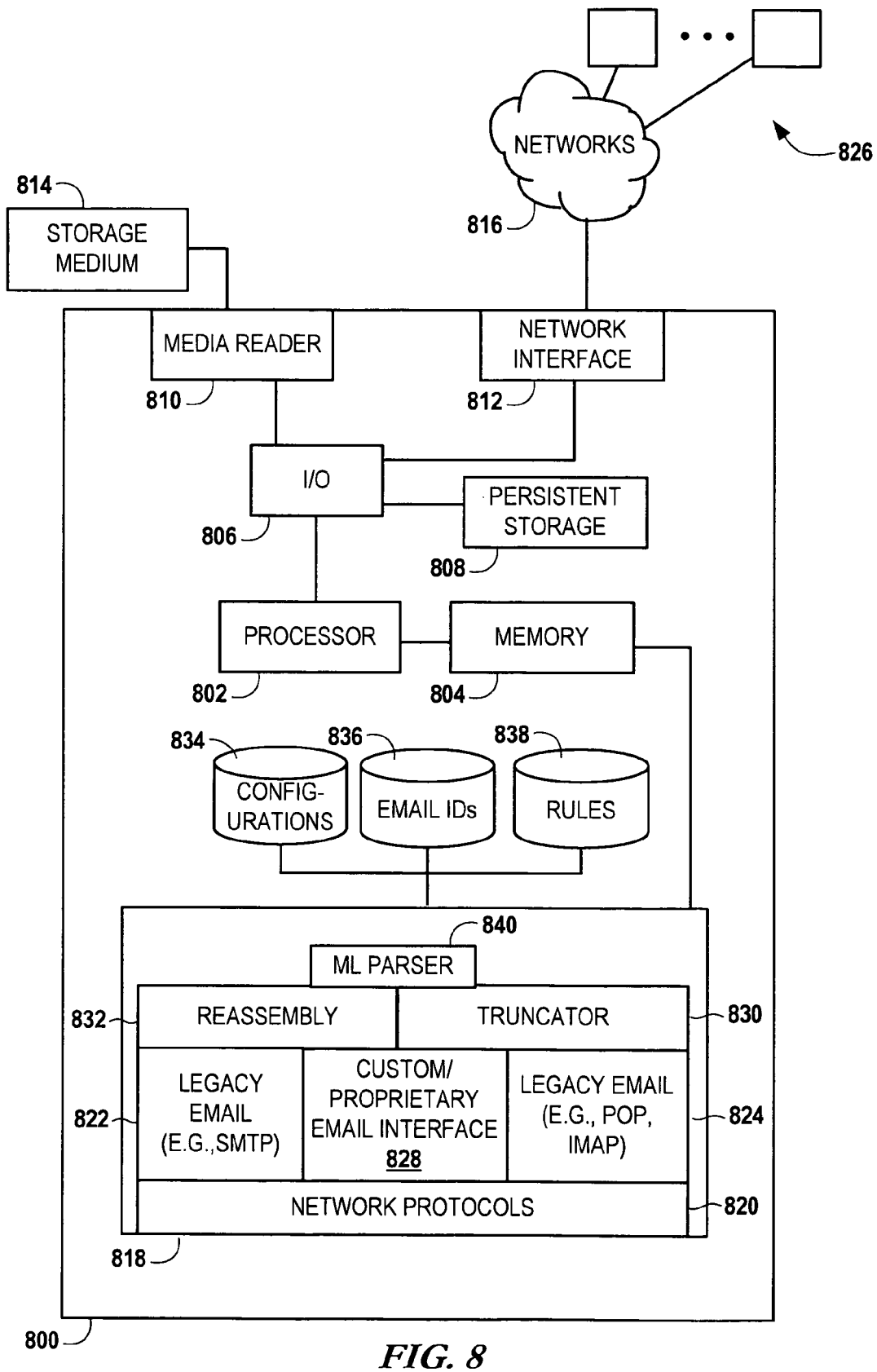
FIG. 8 is a block diagram of a server apparatus according to an embodiment of the invention.

The apparatuses 700, 800 in FIGS. 7 and 8 may include other well-known features that are not illustrated, such as user input devices, user output devices, power circuitry, sensors, etc. As will be appreciated by one of skill in the art, an apparatus having the functions described herein may include a combination of two or more physical devices that are at least coupled via some data transfer medium to form a distributed computing arrangement. In other arrangements, the functions of various components represented by computing instructions 718, 818 can be separated to operate via dependently or independently operating computing arrangements coupled by networks. For example, each function of email interfaces 822, 824, 828, re-assembly/truncation 832, 830, and parsing markup language 840 shown in FIG. 8 can each be separately implemented in physically dispersed apparatus that intercommunicate as described herein, but otherwise operate independently of each other.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method comprising:
   receiving a markup-language-formatted source email having a message size that exceeds a predetermined size limit;
   truncating the source email to conform to the predetermined size limit;
   determining unclosed markup-language tags in the truncated email;
   appending a suffix to the truncated email that includes closing markup-language tags that correspond to the unclosed markup-language tags, the predetermined size limit including the suffix;
   adding to the truncated email: a) a truncation index indicating where the truncation occurred, and b) a unique identifier uniquely identifying the source email stored on an email server;
   sending the truncated email to a recipient email client at a recipient device;
   receiving a markup-language-formatted response email formed at the email client based on the truncated email, wherein the response email includes the truncation identifier, the unique identifier, and the suffix of the source email;
   retrieving the source email based on the unique identifier;

replacing the suffix of the response email with data from the source email that was removed from the truncated email;

sending the response email as replaced to the recipient device;

determining a second truncated message by repeating the truncation of the source email to conform to the predetermined size limit, based, at least in part, on the data from the source email that was removed from the truncated email, wherein the truncated email is further added with attributes related to automatic truncation, the attributes include a source email identification and a point of truncation, and the truncated email includes a leading portion copied verbatim from the source email.

2. The method of claim 1, further comprising:

retrieving the source email based on the unique identifier;

determining a second truncated message by repeating the truncation of the source email to conform to the predetermined size limit determining a second suffix of the second truncated message that includes closing markup-language tags that correspond to unclosed markup-language tags of the second truncated email, wherein data from the source email that was removed from the truncated email is determined based on determining the second truncated message; and sending the response email with a message content portion unaltered based on a mismatch between a suffix of the response email and the second suffix.

3. The method of claim 2, further comprising including the source email as an attachment to the unaltered response email based on the mismatch between the suffix of the response email and the second suffix.

4. The method of claim 1, further comprising adding to the truncated email a selectable object that allows the entirety of the source email to be accessed.

5. The method of claim 1, wherein at least one of the truncation index and unique identifiers are added as an email attribute that is separate from content of the truncated email.

6. An apparatus comprising:

a network interface capable being coupled to a recipient email client via a network;

a processor coupled to the network interface; and at least one memory coupled to the processor and including computer programs code for one or more programs, wherein the at least one memory and the computer program code are configured to, with the at least one processor, cause the apparatus to perform at least the following:

receive a markup language formatted, source email having a message size that exceeds a predetermined size limit;

truncate the source email message to conform to the predetermined size limit;

determine unclosed markup-language tags in the truncated email;

append a suffix to the truncated email that includes closing markup-language tags that correspond to the unclosed markup-language tags, the predetermined size limit including the suffix;

add to the truncated email: a) a truncation index indicating where the truncation occurred, and b) a unique identifier uniquely identifying the source email stored on an email server;

send the truncated email to a recipient email client at a recipient device;

receive a markup-language-formatted response email formed at the email client based on the truncated email, wherein the response email includes the truncation identifier, the unique identifier, and the suffix of the source email;

retrieve the source email based on the unique identifier;

replace the suffix of the response email with data from the source email that was removed from the truncated email;

send the response email as replaced to the recipient device;

determine a second truncated message by repeating the truncation of the source email to conform to the predetermined size limit, based, at least in part, on the data from the source email that was removed from the truncated email, wherein the truncated email is further added with attributes related to automatic truncation, the attributes include a source email identification and a point of truncation, and the truncated email includes a leading portion copied verbatim from the source email.

7. The apparatus of claim 6, wherein the apparatus is further caused to:

retrieve the source email based on the unique identifier;

determine a second suffix of the second truncated message that includes closing markup-language tags that correspond to unclosed markup-language tags of the second truncated email, wherein data from the source email that was removed from the truncated email is determined based on determining the second truncated message; and send the response email with a message content portion unaltered based on a mismatch between the suffix of the response email and the second suffix.

8. The apparatus of claim 7, wherein the apparatus is further caused to include the source email as an attachment to the unaltered response email based on the mismatch between the suffix of the response email and the second suffix.

9. The apparatus of claim 6, wherein the apparatus is further caused to add to the truncated email a selectable object that allows the entirety of the source email to be accessed.

10. The apparatus of claim 6, wherein the apparatus is further caused to verify that the truncated message is well-formed according to rules of the markup language before sending the truncated message to the recipient email client.

11. A non-transitory computer readable storage medium carrying one or more sequences of one or more instructions which, when executed by one or more processors, cause an apparatus to at least perform the following steps:

receive a markup language formatted, source email having a message size that exceeds a predetermined size limit;

truncate the source email to conform to the predetermined size limit;

determine unclosed markup-language tags in the truncated email;

append a suffix to the truncated email that includes closing markup-language tags that correspond to the unclosed markup-language tags, the predetermined size limit including the suffix;

add to the truncated email: a) a truncation index indicating where the truncation occurred, and b) a unique identifier uniquely identifying the source email stored on an email server;

send the truncated email to a recipient email client at a recipient device;

receive a markup-language-formatted response email formed at the email client based on the truncated email, wherein the response email includes the truncation identifier, the unique identifier, and the suffix of the source email;

retrieve the source email based on the unique identifier;

replace the suffix of the response email with data from the source email that was removed from the truncated email;

send the response email as replaced to the recipient device;

determine a second truncated message by repeating the truncation of the source email to conform to the predetermined size limit, based, at least in part, on the data from the source email that was removed from the truncated email, wherein the truncated email is further added with attributes related to automatic truncation, the attributes include a source email identification and a point of truncation, and the truncated email includes a leading portion copied verbatim from the source email.

12. An apparatus comprising:

a network interface capable being coupled to a recipient email client via a network;

at least one processor coupled to the network interface; and at least one memory coupled to the processor and including computer program code for one or more programs, wherein the at least one memory and the computer program code are configured to, with the at least one processor, cause the apparatus to perform at least the following:

determine, via the email client, a markup language formatted, source email targeted for the email client and having a message size that exceeds a predetermined size limit;

download a portion of the source email that is used to form a truncated email conforming to the predetermined size limit;

determine unclosed markup-language tags in the truncated email;

append to the truncated email a suffix that includes closing markup-language tags that correspond to the unclosed markup-language tags to the truncated email, the predetermined size limit including the suffix;

add to the truncated email: a) a truncation index indicating where the truncation occurred, and b) a unique identifier uniquely identifying the source email stored on an email server;

send the truncated email to a recipient email client at a recipient device;

receive a markup-language-formatted response email formed at the email client based on the truncated email, wherein the response email includes the truncation identifier, the unique identifier, and the suffix of the source email;

retrieve the source email based on the unique identifier;

replace the suffix of the response email with data from the source email that was removed from the truncated email;

send the response email as replaced to the recipient device;

determine a second truncated message by repeating the truncation of the source email to conform to the predetermined size limit, based, at least in part, on the data from the source email that was removed from the truncated email, wherein the truncated email is further added with attributes related to automatic truncation, the attributes include a source email identification and a point of truncation, and the truncated email includes a leading portion copied verbatim from the source email.

13. The apparatus of claim 12, wherein forming the response email comprises:

including in the response email the suffix of the source email; and preventing user editing of a suffix of the response email.

14. The apparatus of claim 12, wherein the apparatus is further caused to:

add to the truncated email a selectable object that allows the entirety of the source email to be accessed; and facilitate accessing the entirety of the source email based on user selection of the selectable object.

* * * * *